US010136354B2

(12) United States Patent
Ahmadi

(10) Patent No.: US 10,136,354 B2
(45) Date of Patent: Nov. 20, 2018

(54) APPARATUS AND METHODS FOR IMPROVED PACKET FLOW MOBILITY

(71) Applicant: Apple Inc., Cupertino, CA (US)

(72) Inventor: Sassan Ahmadi, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/219,777

(22) Filed: Jul. 26, 2016

(65) Prior Publication Data

US 2017/0034734 A1 Feb. 2, 2017

Related U.S. Application Data

(63) Continuation of application No. 14/503,251, filed on Sep. 30, 2014, now Pat. No. 9,414,256, which is a continuation of application No. 13/627,969, filed on Sep. 26, 2012, now Pat. No. 8,908,523.

(60) Provisional application No. 61/637,198, filed on Apr. 23, 2012.

(51) Int. Cl.
*H04W 28/02* (2009.01)
*H04L 12/803* (2013.01)
*H04L 12/801* (2013.01)
*H04W 88/06* (2009.01)

(52) U.S. Cl.
CPC ....... *H04W 28/0273* (2013.01); *H04L 47/122* (2013.01); *H04L 47/34* (2013.01); *H04W 28/0205* (2013.01); *H04W 28/0247* (2013.01); *H04W 88/06* (2013.01)

(58) Field of Classification Search
CPC ............. H04W 88/06; H04W 28/0273; H04W 28/0205; H04W 228/0247
See application file for complete search history.

(56) References Cited

U.S. PATENT DOCUMENTS

| | | | |
|---|---|---|---|
| 6,452,915 B1* | 9/2002 | Jorgensen | H04L 1/20 370/328 |
| 2002/0085641 A1* | 7/2002 | Baum | H04L 1/0009 375/260 |
| 2003/0189935 A1 | 10/2003 | Warden et al. | |

(Continued)

OTHER PUBLICATIONS

3GPP ETSI TS 123 261 V10.2.0 (Mar. 2012), Mar. 2012, 24 pages.
3GPP TS 36.300 V11.1.0 (Mar. 2012), pp. 89-92, Mar. 2012, 194 pages total.

*Primary Examiner* — Charles C Jiang
*Assistant Examiner* — Thad Defauw
(74) *Attorney, Agent, or Firm* — Dickinson Wright RLLP

(57) ABSTRACT

Methods and apparatus for improved packet data flow mobility and packet data distribution and collection across heterogeneous networks. In one embodiment, a source device with one or more wireless interfaces receives data to be transmitted to a target device. The device sequences the received data with corresponding packet sequence numbers according to characteristics of the service providing the data. The sequenced data is classified according to application/service requirements (e.g., minimum Quality of Service requirements, service type, etc.). The classified data is assigned to available network interfaces, which can support the classifications of the data. The data is transmitted over the assigned network interfaces to the corresponding receiving interface. The data is collected and reassembled according to the packet sequence number at the target destination.

20 Claims, 10 Drawing Sheets

(56) References Cited

U.S. PATENT DOCUMENTS

| | | | |
|---|---|---|---|
| 2003/0210664 A1* | 11/2003 | Achour | H04W 72/1289 370/329 |
| 2006/0123169 A1* | 6/2006 | Chai | G06F 13/161 710/116 |
| 2007/0041350 A1 | 2/2007 | Famolari | |
| 2008/0008196 A1 | 1/2008 | Hong | |
| 2009/0019505 A1 | 1/2009 | Gopalakrishnan et al. | |
| 2009/0080421 A1 | 3/2009 | Ou | |
| 2009/0238090 A1* | 9/2009 | Sambhwani | H04W 28/16 370/252 |
| 2010/0318830 A1* | 12/2010 | Tsuchizawa | G01R 31/3171 713/375 |
| 2011/0007693 A1* | 1/2011 | Frusina | H04L 5/003 370/329 |
| 2013/0237226 A1* | 9/2013 | Periyalwar | H04W 76/026 455/436 |
| 2014/0079007 A1 | 3/2014 | Li et al. | |

\* cited by examiner

APPARATUS AND METHODS FOR IMPROVED PACKET FLOW MOBILITY

CROSS REFERENCE TO RELATED APPLICATIONS

This application is a continuation of U.S. application Ser. No. 14/503,251, filed Sep. 30, 2014, now U.S. Pat. No. 9,414,256, which is a continuation of U.S. application Ser. No. 13/627,969, filed Sep. 26, 2012, now U.S. Pat. No. 8,908,523, which claims the benefit of U.S. Provisional Patent Application Ser. No. 61/637,198, filed Apr. 23, 2012. All of which are incorporated by reference herein in their entireties for all purposes.

BACKGROUND OF THE INVENTION

1. Field of Invention

The present invention relates generally to operation within heterogeneous wireless systems such as, for example, hybrid network operation in which client or user devices can communicate using any one of two or more networks. More particularly, in one exemplary aspect, the present invention is directed to methods and apparatus for dynamically allocating data flows across heterogeneous networks.

2. Description of Related Technology

Mobile client devices have evolved from single-radio devices to multiple-radio devices configured to support different radio access technologies. For example, an exemplary mobile cellular device may include both a cellular radio (e.g., Long Term Evolution (LTE)) as well as a wireless local area network (WLAN) radio (e.g., IEEE 802.11-based wireless).

SUMMARY OF THE INVENTION

The present invention satisfies the aforementioned needs by providing, inter alia, improved apparatus and method for dynamic IP Flow mobility across heterogeneous networks.

In a first aspect of the invention, a method for dynamically allocating data flows across heterogeneous network interfaces is disclosed. In one embodiment, the method includes: sequencing portions of data to be transmitted over two or more interfaces; classifying the data according to one or more parameters; assigning the portions of the data to the two or more interfaces based at least on part on the classification; and transmitting the portions of data over the assigned two or more interfaces.

In a second aspect of the invention, a client or user device is disclosed. In one embodiment, the device is capable of dynamically allocating a packet corresponding to a service flow or IP flow across heterogeneous networks, and includes: a processor; at least first and second wireless interfaces in data communication with the processor; and a storage device in data communication with the processor, the storage device comprising at least one computer program. In one variant, the program is configured to, when executed on the processor dynamically allocate packet data flows across the first and second wireless interfaces by at least: sequencing portions of data to be transmitted over first and second interfaces; characterizing the data according to one or more parameters; assigning the portions of the data to the first and interfaces based at least on part on the characterization; and transmitting the assigned portions of data over the interfaces.

In another embodiment, the device is a mobile user wireless apparatus that includes a processor; at least first and second wireless interfaces in data communication with the processor; and logic configured to dynamically allocate packet data flows across the first and second wireless interfaces by at least: obtaining feedback information from a receiver apparatus regarding the quality or reliability of at least one of the first and second wireless interfaces; selectively allocating at least portions of a first packet data flow over at least one of the first and second wireless interfaces based at least in part on the feedback information; and transmitting the allocated at least portions of the data flow over the at least one interface based on the selective allocation.

In a third aspect of the invention, wireless network apparatus is disclosed. In one embodiment, the apparatus includes a processor; at least first and second wireless interfaces in data communication with the processor; and computerized logic configured to dynamically allocate packet data flows across the first and second wireless interfaces by at least selectively allocating at least portions of a first packet data flow over at least one of the first and second wireless interfaces based at least in part on information relating to one or more attributes of the first packet data flow, and transmitting the allocated at least portions of the data flow over the at least one interface based on the selective allocation. In one variant, the computerized logic is further configured to operate substantially at the network layer of the mobile apparatus so as to be independent of lower-layer functions.

In a fourth aspect of the invention, network apparatus is disclosed which includes a processor, at least first and second wireless interfaces in data communication with the processor; and a storage device in data communication with the processor. In one embodiment, the storage device comprising at least one computer program configured to, when executed on the processor, dynamically allocate packet data flows across the first and second wireless interfaces by at least: receiving via one of the first and second wireless interfaces a request for a packet data flow from a mobile device; sequencing portions of data flow to be transmitted over first and second interfaces; characterizing the data according to one or more parameters; assigning the portions of the data to the first and interfaces based at least on part on the characterization; and transmitting the assigned portions of data over the interfaces to the requesting mobile device.

In another embodiment, the network apparatus includes logic disposed at a network layer thereof and configured to selectively route packets belonging to a common Internet Protocol (IP) data flow across two or more heterogeneous radio access technology interfaces accessible to the network apparatus to respective two or more heterogeneous radio access technology interfaces of a mobile wireless device with which the network server apparatus communicates.

In a fifth aspect of the invention, a computer-readable storage apparatus is disclosed.

In a sixth aspect of the invention, a heterogeneous wireless system is disclosed.

Other features and advantages of the present invention will immediately be recognized by persons of ordinary skill in the art with reference to the attached drawings and detailed description of exemplary embodiments as given below.

Figure 1:
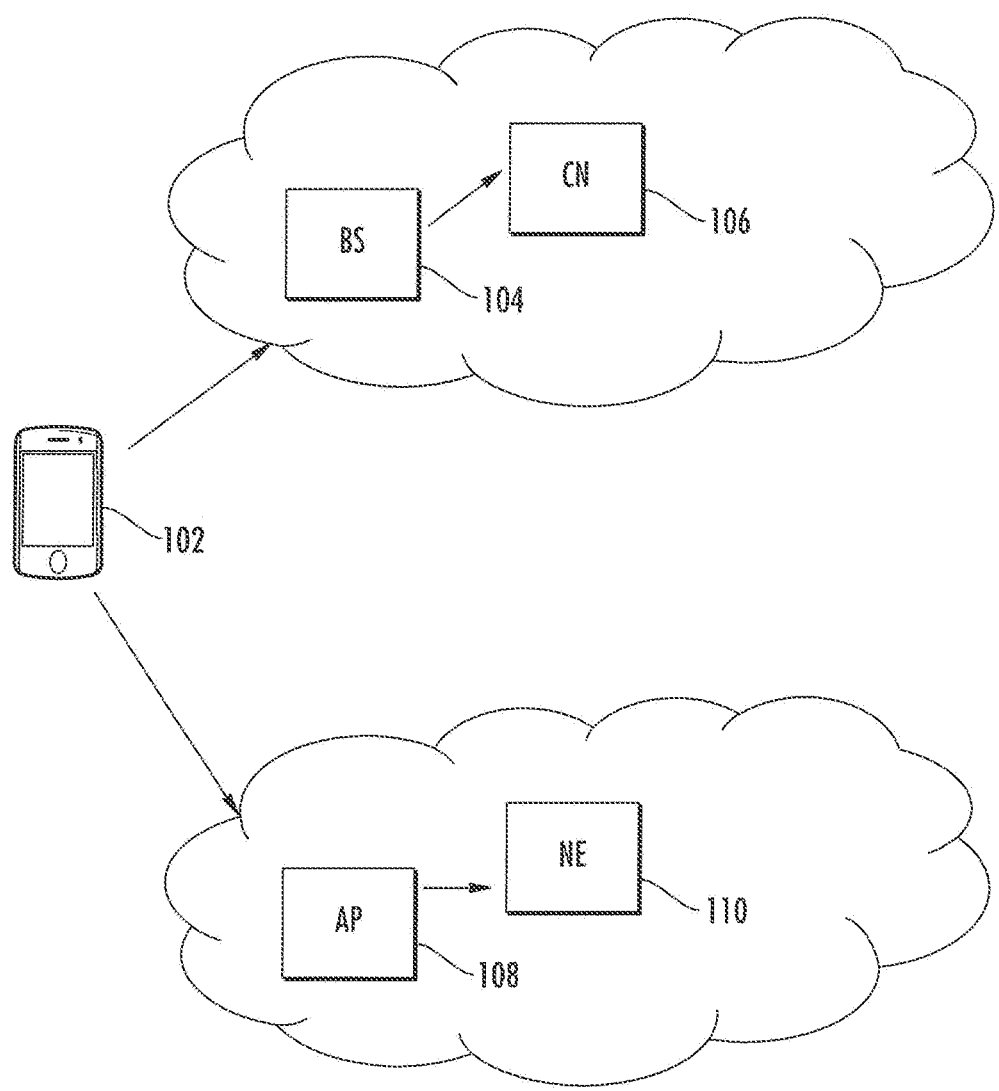
FIG. 1 is a logical block diagram illustrating an exemplary heterogeneous network system useful in conjunction with the present invention.

All Figures© Copyright 2012 Apple Inc. All rights reserved.

DETAILED DESCRIPTION OF THE INVENTION

Reference is now made to the drawings, wherein like numerals refer to like parts throughout.

Overview

Mobile devices can support connections to multiple heterogeneous radio access technologies, such as for example Long Term). Evolution LTE networks and IEEE 802.11-based wireless local area networks. Additionally, mobile devices implementing packet data (e.g., IP data) flow mobility functionality can transfer IP data flows across one radio access technology to another radio access technology in order to, for example, provide more reliable service or free up network resources.

However, current IP flow mobility functionality must route all packets belonging to the same IP flow to a single radio access technology, and cannot spread packets belonging to the same IP flow across multiple radio access technologies available on the mobile device. Since the mobile device cannot take advantage of all radio access technologies available to the device, various embodiments of the present invention are directed at improvement of IP flow mobility and WLAN offloading schemes across heterogeneous networks, including use of two or more air interfaces available to a mobile device (or network apparatus such as a base station).

Detailed Description of Exemplary Embodiments

Exemplary embodiments and aspects of the present invention are now described in detail. While these embodiments and aspects are primarily discussed in the context of heterogeneous networks of Long Term Evolution (LTE) cellular network and a WLAN (e.g., IEEE 802.11-based wireless network), it will be recognized by those of ordinary skill that the present invention is not so limited, and can be used with other cellular and/or wireless access technologies such as TD-LTE (Time-Division Long-Term Evolution), TD-LTE-Advanced, TD-SCDMA (Time Division Synchronous Code Division Multiple Access) and Global System for Mobile Communications (GSM), General Packet Radio Service (GPRS), Code Division Multiple Access (CDMA) 2000 1×, CDMA 1×EVDO (Evolution Data Optimized), and Worldwide Interoperability for Microwave Access (WiMAX). In fact, the various aspects of the invention are useful in combination with any network or combinations thereof (cellular, wireless, wireline, or otherwise) that can benefit from allocation of data flows across heterogeneous networks.

Existing Heterogeneous Networks Technologies—

In the following discussion, an exemplary heterogeneous network is illustrated comprising a cellular radio system that includes a network of radio cells each served by a transmitting station, known as a cell site or base station (BS), as well as a wireless local area network (WLAN), such as an 802.11-based network which may be served using an access point (AP). The radio network provides wireless communications service for a plurality of mobile station (MS) devices.

With respect to cellular radio systems, the network of BSs working in collaboration allows for wireless service, which is greater than the radio coverage provided by a single serving BS. The individual BSs are connected to a Core Network, which includes additional controllers for resource management, and is in some cases capable of accessing other network systems (such as the Internet, other cellular networks, etc.). In addition, the MS may able to be connected to other BSs implementing via other wireless communication technologies. For example, a MS may have network access to a Long Term Evolution (LTE) network and an 802.11-based network, each of which is capable of implementing a Quality of Service (QoS) policy.

As a brief aside, in the context of an LTE cellular network, the Evolved Packet System (EPS) bearer/E-RAB (radio bearer) is the level of granularity for bearer-level QoS control in the Evolved Packet Core (EPC)/UMTS Terrestrial Radio Access Network (UTRAN). Service data flows mapped to the same EPS bearer receive the same bearer-level packet forwarding treatment (e.g., scheduling policy, queue management policy, rate shaping policy, RLC configuration, etc.) One EPS bearer/E-RAB is established when a client device connects to a PDN; this remains throughout the lifetime of the PDN connection to provide the client device with always-on IP connectivity to that PDN. The aforementioned bearer is referred to as the default bearer. Any additional EPC/E-RAB that is established to the same PDN is referred to as a "dedicated bearer". The initial bearer level QoS parameter values of the default bearer are assigned by the network, based on subscription data. The decision to establish or modify a dedicated bearer can only be taken by the EPC, and the bearer level QoS parameter values are assigned by the EPC. An EPS bearer is referred to as a "GBR" (Guaranteed Bit Rate) bearer if dedicated network resources are permanently allocated (e.g., by an admission control function in the eNodeB) at time of bearer establishment or modification. Otherwise, an EPS bearer/E-RAB is referred to as a "Non-GBR bearer". A dedicated bearer can either be a GBR or Non-GBR bearer, while a default bearer is a Non-GBR bearer.

FIG. 1 illustrates two exemplary heterogeneous networks and a client device 102, operating within the coverage of Radio Access Networks (RAN) provided by a number of base stations (BSs) 104 as well as an Access Point (AP) 108 of an 802.11-based system. The RAN is the collective body of base stations and associated network entities that are controlled by a Mobile Network Operator (MNO). The AP 108 enables the client device 102 to communicate over the associated Network Entity 110. The user interfaces to the RAN via the client devices, which in many typical usage cases is a cellular phone or smartphone. However, as used herein, the terms "mobile station", "mobile device", "client device", "user equipment", and "user device" may include, but are not limited to, cellular telephones, smart phones (such as for example an iPhone™ manufactured by the Assignee hereof), personal computers (PCs) and minicomputers, whether desktop, laptop, or otherwise, as well as mobile devices such as handheld computers, PDAs, personal media devices (PMDs), tablet computers such as the exemplary iPad™ device manufactured by the Assignee hereof, or any combinations of the foregoing.

As shown in FIG. 1, a RAN is coupled to a Core Network 106 of the MNO. The Core Network 106 and Network Entity 110 provide both routing and service capabilities. For example, a client device connected to a base station can communicate via the BS, or communicate via a connected WLAN AP 108. The client device can access types of services e.g., the Internet, via the Core Network or via the associated Network Entity of the AP 108. The Core Network performs a wide variety of functions, including without limitation, authentication of client devices, authorization of client devices for various services, billing client devices for provisioned services, call routing, etc.

As another brief aside, cellular networks are owned and operated by an MNO. Typically, a MS is used in a so-called "home network"; the MS's home network is operated by the MNO and has the information necessary to authenticate and provision service to the MS (e.g., cryptographic keys used for authentication, service agreements, billing information, etc.). However, the MS may "roam" outside of the home network; accordingly, so-called "roaming" access refers to the set of services that are provided by a "visited network" with which the client device is not associated. Visited networks are typically operated by a different MNO than the MNO that a mobile device is associated with, however this is not always true (e.g., due to business arrangements, legal regulation, etc.). Roaming services are negotiated between MNOs to provide reciprocal service agreements to improve service coverage for their subscriber populations, respectively. For example, MNOs typically negotiate roaming relationships with other MNOs in different countries to enable accessibility of voice, data and other supplementary services for their subscribers when they travel internationally. In addition, the BS of the roaming network may implement a radio access technology (RAT) different from the home network BS if the client device is so equipped with the proper network interfaces.

With respect to WLAN, WLAN links devices using some wireless distribution scheme (e.g., IEEE 802.11 standards), providing a connection through an AP to the wider network such as the Internet or a wide area network (WAN). An AP can be a main base station (BS), relay BS, or remote BS. In typical implementations, the main BS is directly connected to the wider network using a wired or optical connection such as a broadband connection (e.g., DOCSIS modem, fiber drop, etc.). A relay BS relays data between other relay BSs, remote BSs, and MS to either another relay BS or main BS. The remote BS accepts connections from an MS, and relays the communication from the MS to either a relay BS or the main BS. Accordingly, WLAN provides users of MS devices with mobility to move within a local coverage area, while still being connected to the wider network.

IP Flow Mobility—

The following discussion details an exemplary IP flow mobility operation. IP flow mobility allows a base station/client device to route IP flows through different radio access networks (RAN) that are available in the base station or on the client device by switching from one radio access technology to another radio access technology. The IP address of the client device remains the same as the user moves across different RANs. However, existing IP flow mobility functionality does not allow for sharing assigned IP packets of an IP flow through different radios but instead requires that the IP packets belonging to the same IP flow must go through a single radio. Accordingly, if the device switches the radio (air interface), the entire IP flow path must be moved to the new radio. For example, a client device may have two radio access technologies (RAT) available; i.e., an LTE radio and an 802.11-based radio (i.e., Wi-Fi). An application resident on the device is routing its data flow through the Wi-Fi radio, while the LTE radio is relieved from providing this service. However, if the client device moves out of range of the Wi-Fi RAN (or the RAN becomes otherwise unavailable), the client device would switch the IP flow of the application to the LTE RAT.

Figure 2:
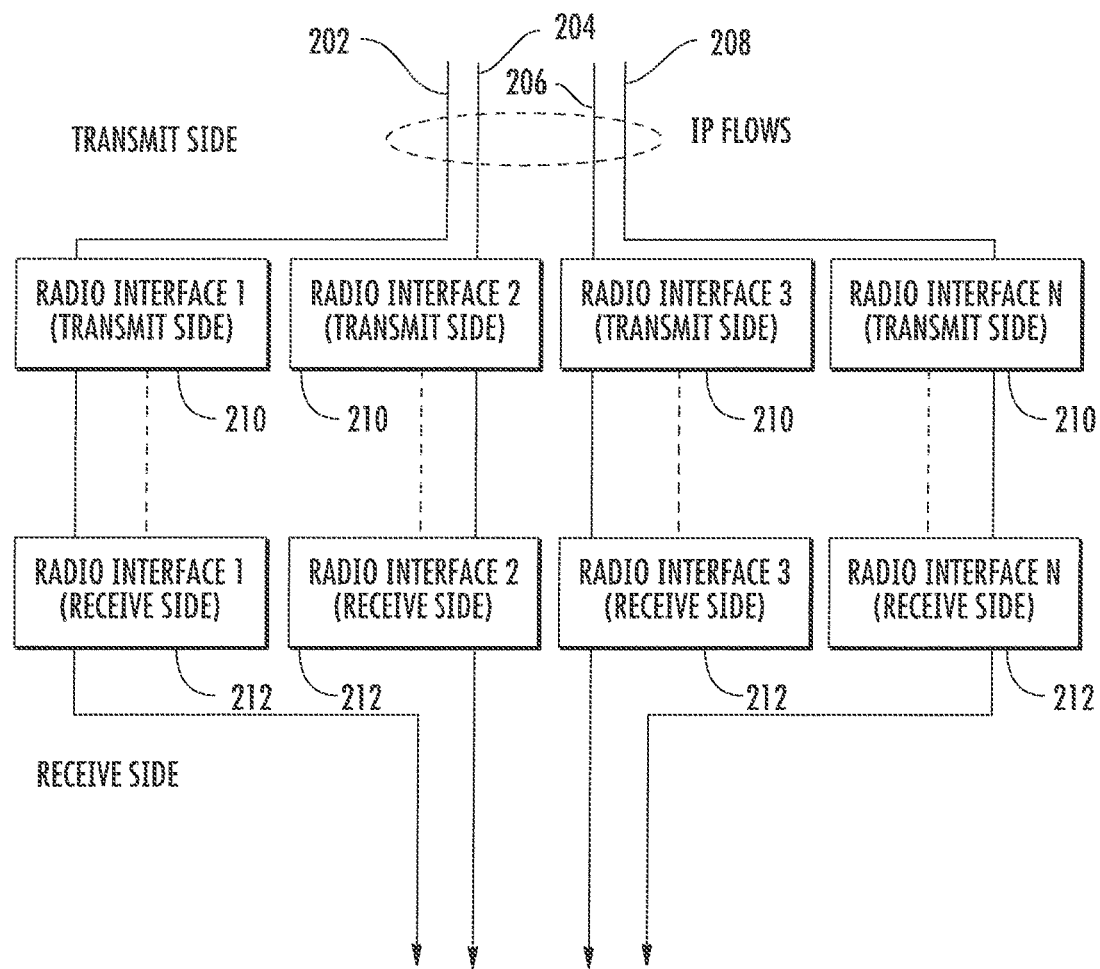
FIG. 2 is a logical block diagram illustrating an exemplary prior art Internet Protocol (IP) flow mobility operation.

Referring now to FIG. 2, a logical block diagram of an exemplary IP flow mobility operation according to the prior art is illustrated. IP flows 202, 204, 206, 208 are generated by the applications, and are communicated to the transmit side of the device or the base station. The IP flows 202, 204, 206, 208 are each assigned to a respective radio interface 210. Common examples of radio interfaces useful with the present invention are LTE, Global Standards for Mobile Communications Code Division Multiple Access (CDMA) 2000 (CDMA2000), and 802.11-based wireless, although it will be appreciated that any number of other technologies may be substituted.

As shown in FIG. 2, prior art IP flow is routed to the same radio interface, and is not shared concurrently between the radio interfaces 210. The radio interfaces 210 transmit the data of the IP flows 202, 204, 206, 208 to the respective radio interfaces 212 of the receive side. The data of the IP flows are subsequently routed to their destination accordingly based on the protocol used.

Exemplary IP Flow Mobility Operation

Figure 3:
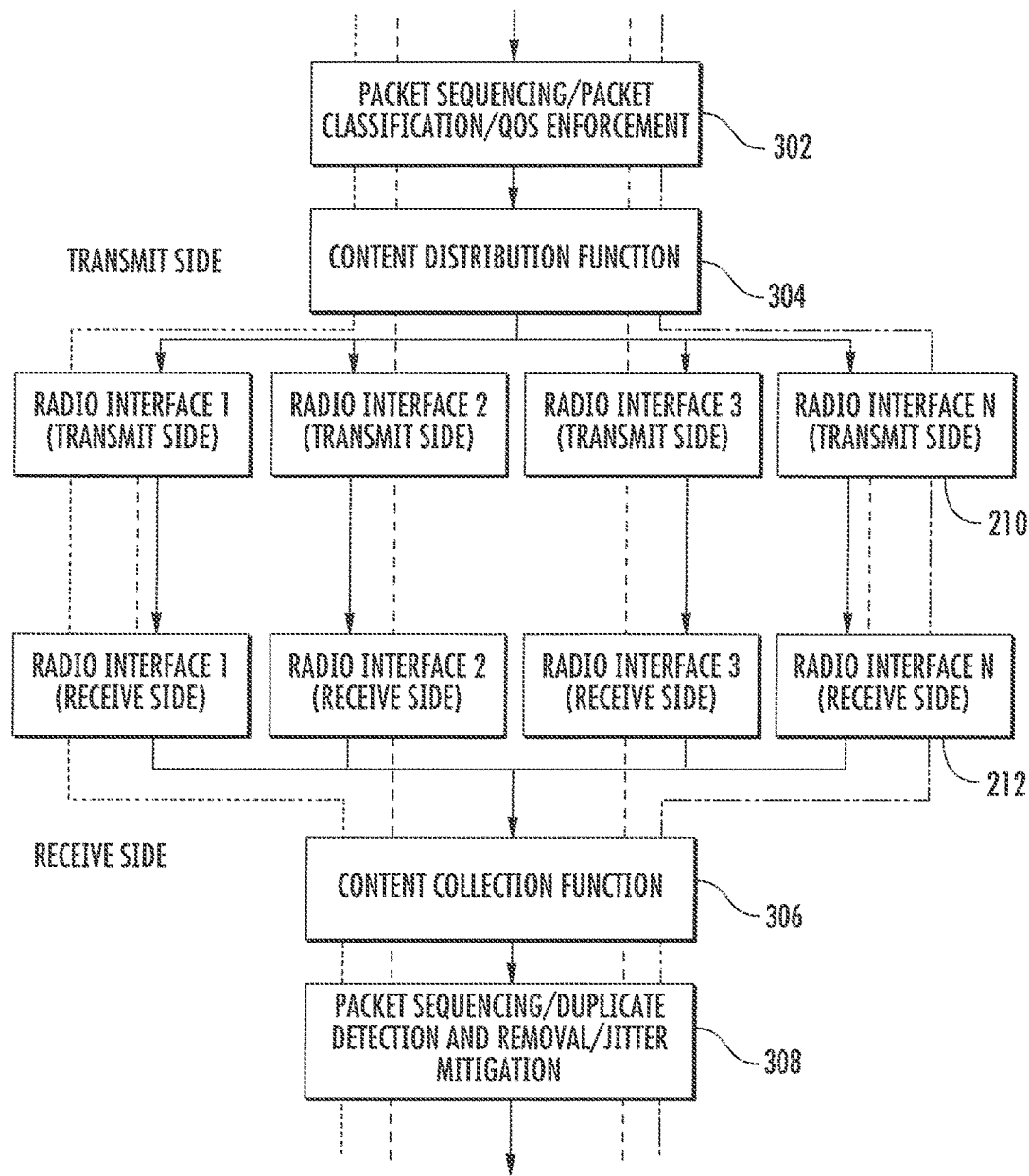
FIG. 3 is a logical block diagram illustrating an exemplary improved heterogeneous IP flow mobility configured in accordance with the present invention.

One aspect of the present invention contemplates dynamically directing individual packets belonging to the same IP flow generated by an application in the device or the network across the available RATs, either concurrently or separately, as shown in FIG. 3. Specifically, FIG. 3 illustrates an exemplary embodiment of improved heterogeneous IP flow mobility process configured in accordance with principles of the present invention.

In one embodiment, the IP flow mobility process includes a packet sequencing function 302, as well as a content distribution function 304 at the transmit side. In addition, the receive side further includes a content collection function 306 and packet sequencing function 308. As will be discussed in greater detail below, the packet sequencing function 302 and content distribution function 304 enable an IP flow to spread across multiple radio interfaces 210, instead of requiring the entire IP flow to be only assigned to one radio interface 210 at a time (such as is shown in the prior art solution of FIG. 2). The content collection function 306 and packet sequencing function 308 allow for the data transmitted over the multiple radio interfaces 210 to be properly received, as discussed in greater detail below.

Figure 4:
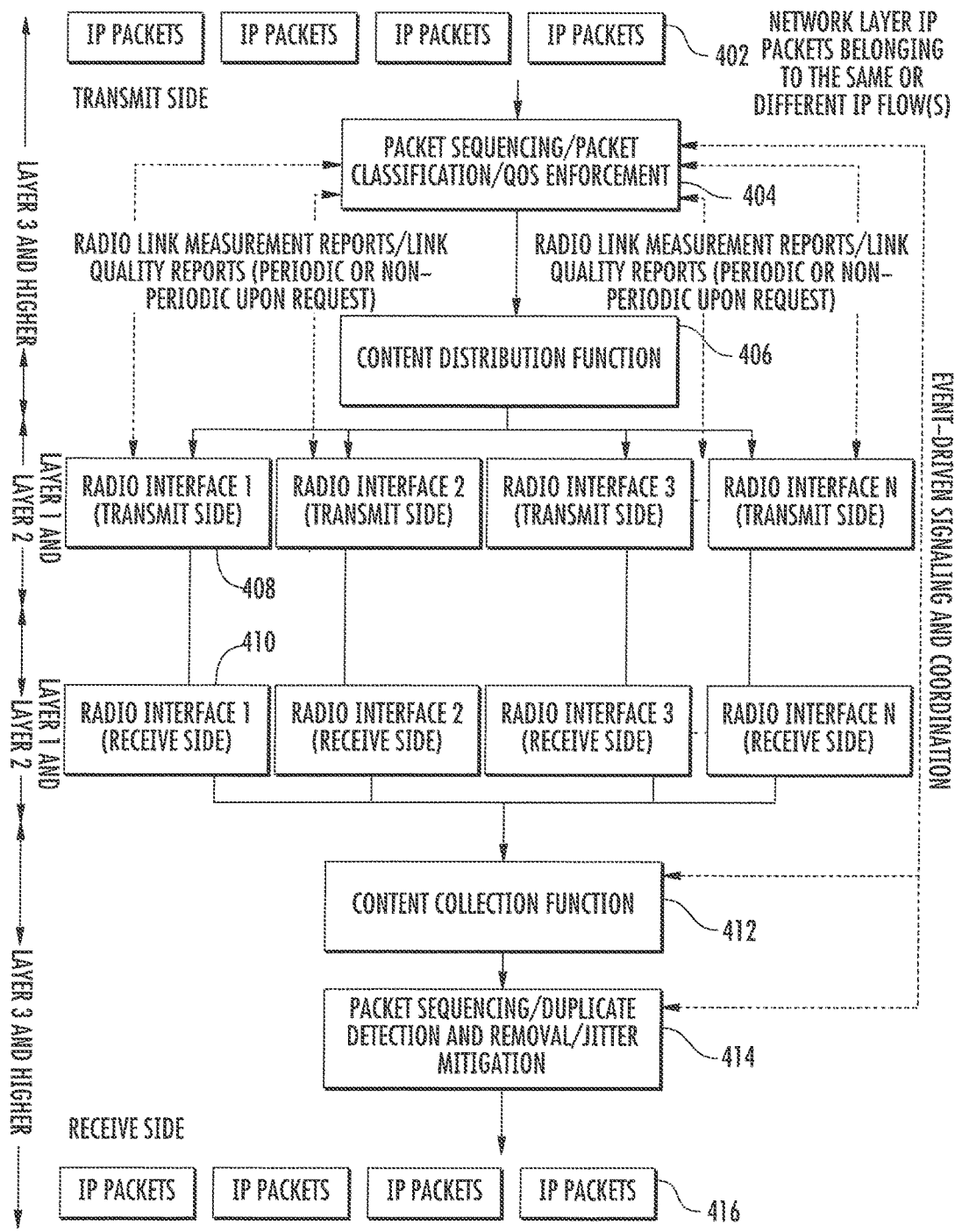
FIG. 4 is a functional block diagram of an exemplary implementation of the improved heterogeneous IP flow mobility of FIG. 3.

Referring now to FIG. 4, an exemplary implementation of the IP flow process of FIG. 3 is illustrated. Depending on the availability of at least one radio connection with an acceptable radio condition (for example, to guarantee a QoS requirement of a service flow, and/or based on interaction with the radio resource management on each link (if applicable) to determine the size of the packets that can be transmitted via each radio connection), the IP packets are classified and distributed among the available radio connections according to FIG. 4.

As a brief aside, the Open System Interconnection (OSI) model is a representation of functions of a communication in terms of abstract layers. A layer serves a layer above it, and is served by a layer below it. According to the OSI model, the layers (ascending order from lowest layer to highest layer) consist of the physical layer, the data link layer, the network layer, the transport layer, etc. The Internet Protocol (IP) is classified as part of the network layer, the network layer being responsible for path determination and logical addressing of transmitting data.

As shown in FIG. 4, the network layer IP packets 402 belonging to the same or different IP flows on the transmit side arrive at the Packet Sequencing/Classification and QoS Enforcement block 404. In one implementation, the Packet Sequencing/Classification and QoS Enforcement function block 404 is responsible for each of the aforesaid functions; i.e., packet sequencing, packet classification, and QoS enforcement, although these functions may be distributed to one or more other devices as well.

The packet sequencing function, in one exemplary embodiment, is responsible for adding a sequence number indication to IP packet data to enable reorganization of the data in the correct sequence. Packet sequencing is not required when only using a single radio interface 210, as the IP flow is going through the same radio interface (and thus there is no need guarantee the proper receive order of the packet data). However, when spreading an IP flow across multiple RATS, the packet data may be received out of sequence, as each radio interface 210 has its own communication characteristics (e.g. maximum data rate, connection quality, current transmission speed, etc.). Accordingly, packet sequencing compensates for the possible out of order delivery by enabling any re-ordering of the packets at the receiver side (or other corrective functions).

The packet classification function, in one exemplary implementation, is responsible for classifying and associating the incoming data packet data according to one or more designated criteria. For example, designated criteria may include priority of the particular packet data, minimum QoS requirements, parameters related to the service generating the data, amount of radio resources required, etc.

The Quality of Service (QoS) enforcement function, in one variant, is responsible for monitoring radio link measurements, and/or receiving link quality reports periodically. The period of the report is configurable, and the configuration of the period may differ for each of the radio interfaces 408. In another implementation, the monitoring occurs non-periodically. For example, the monitoring may occur upon the request from the corresponding RAT radio resource management or equivalent unit, upon the occurrence of another event, or even periodically or randomly.

Accordingly, one salient advantage of the exemplary QoS enforcement function described herein is that higher priority or delay-sensitive packets may be ensured to be routed by the Content Distribution function 406 to the faster and/or more reliable radio interfaces 408. Thus, performance and reliability of transmitted these data packets is improved. It will be appreciated that other metrics for routing may be utilized, whether alone or in conjunction with one or both of the foregoing. For instance, metrics such as connection latency may be considered (i.e., a given interface may have a higher data rate than another, yet have significantly longer initial connection latency, thereby rendering it less desirable in certain cases). Battery conservation may also be considered (e.g., a slightly slower interface may use appreciably less battery power, which is important for mobile devices).

In one implementation, the Packet Sequencing/Classification and QoS Enforcement block 404 is further configured to exchange event-driven signaling with the Content Collection Function 412 and Packet Sequencing/Duplicate Detection and Removal/Jitter Mitigation functional blocks 414 at the receive side. The event signaling may be implemented using IP-layer signaling and coordination messages (e.g., sending messages using IP protocol such that transmission and reception of the message is transparent to the radio interfaces 408, 410) with the Packet Sequencing/Duplicate Detection and Removal/Jitter Mitigation 414, in order to optimize the distribution and collection of IP packets across the various radio links.

One salient advantage of communicating the event-driven signaling is providing the transmit side with useful feedback on the performance and reliability of the different radio links that are available for distribution of the content. In addition, the feedback from the receiver side allows for the Packet Sequencing/Classification and QoS Enforcement block 404 to account for the ability of the receiver side to retrieve and reconstruct the content with acceptable degradation. For example, depending on the actual effective bandwidth that may be become available, only the higher priority packets may be transmitted across more reliable radio links under adverse channel conditions.

The Content Distribution function 406 receives the data (and the data's respective classification) from the Packet Sequencing/Classification and QoS Enforcement block 404. In one embodiment, the Content Distribution function 406 is located at the network layer. One advantage of the Content Distribution function being disposed at the network layer is possible independence from functions of the data link layer, for example the Media Access Control (MAC) layer packet data unit (PDU) scheduling and transmission functionality corresponding to each radio interface. The Content Distribution function 406 distributes the data packets to assigned radio interfaces 408.

In order to make a radio interface assignment, the Content Distribution function 406 may be configured to receive information and statistics of the radio interfaces 408. For example, the information and statistics may include the availability of the radio link, the quality of the radio link, maximum sustained data rate over the radio link, reliability of the radio link, maximum delay over the radio link, maximum radio resource size that can be allocated over the radio link, etc. Based on the received information, the Content Distribution function can determine the amount of data that can be routed through each available radio link and/or which radio links are suited to carry IP data from particular service. In one implementation, the Content Distribution function ensures that the IP packets that were already assigned from transmission over radio interfaces 408 that have become unavailable, are reassigned to other available radio interfaces 408, thereby mitigating any interruption in service. In one variant, the Content Distribution function 406 coordinates with individual schedulers of each radio interface 408, as some radio interfaces 408 may not be able to operate concurrently. For example, an inter-RAT interface may restrict simultaneous use of some of the radio interfaces 406 which the Content Distribution function 408 can account for during distribution of assigned IP packets.

Another salient advantage of the present invention is that header compression schemes of IP/UPD/RTP or IP/TCP (for example Robust Header Compression (RoHC)) operating on the different radio links are not significantly impacted by the distribution function, given that the header compression follows static and dynamic fields of the headers of the IP packets that are routed through a particular radio link. It will be appreciated by those of ordinary skill however that not all radio interface technologies support header compression as part of the baseband processing, and the various aspects of the present invention may be used in either case.

The radio interfaces 408 transmit IP packets as distributed by the Content Distribution function 406 to the respective receiver side radio interfaces 410. In one embodiment, the radio interfaces are responsible for monitoring metrics of the radio link of the respective receiver radio interfaces 410, such as for example a channel quality indication (CQI), SINR, and/or other useful parameters for assessing channel operability and reliability.

Upon receiving the IP packets at the receiver radio interfaces 410, the radio interfaces 410 provide the received IP packets to the Content Collection function 412. In one embodiment, the Content Collection function 412 is responsible for controlling the receipt and collection of the received IP packets. The Content collection function 412 tracks whether packets are received, such as by the packet sequencing information (e.g., an assigned sequence number embedded in each packet) associated with the received packets. Accordingly, if a packet sequence number is missing out of a sequence of packet sequence numbers, the Content Collection function 412 can identify which IP packets are missing. The Content Collection function 412 can determine whether or not to re-request any missing IP packets, or determine that the data can be reconstructed without the missing packet(s). The determination of re-request is in the exemplary embodiment service-dependent. Certain services such as voice or audio can tolerate a certain amount of packet loss, while other services (such as data) require the receipt of all packets in order to reconstruct the transmitted information. Accordingly, it is appreciated that the present invention may be utilized in both "lossy" and non-lossy contexts with equal success.

The Content Collection function 412 provides the collected IP packets to the Packet Sequencing/Duplicate Detection and Removal/Jitter Mitigation function 414. In one embodiment, the Packet Sequencing/Duplicate Detection and Removal/Jitter Mitigation function 414 is responsible for organizing the received IP packets according to the packet sequence number. In addition, any detected duplicate IP packets are removed, and any desired jitter management functionality on the received IP packets is applied (such as for example discard or packets received outside of a "jitter window" as being received too late). The Packet Sequencing/Duplicate Detection and Removal/Jitter Mitigation function 414 provides the resultant IP packets 416 to the receive side for any further required processing.

Figure 5:
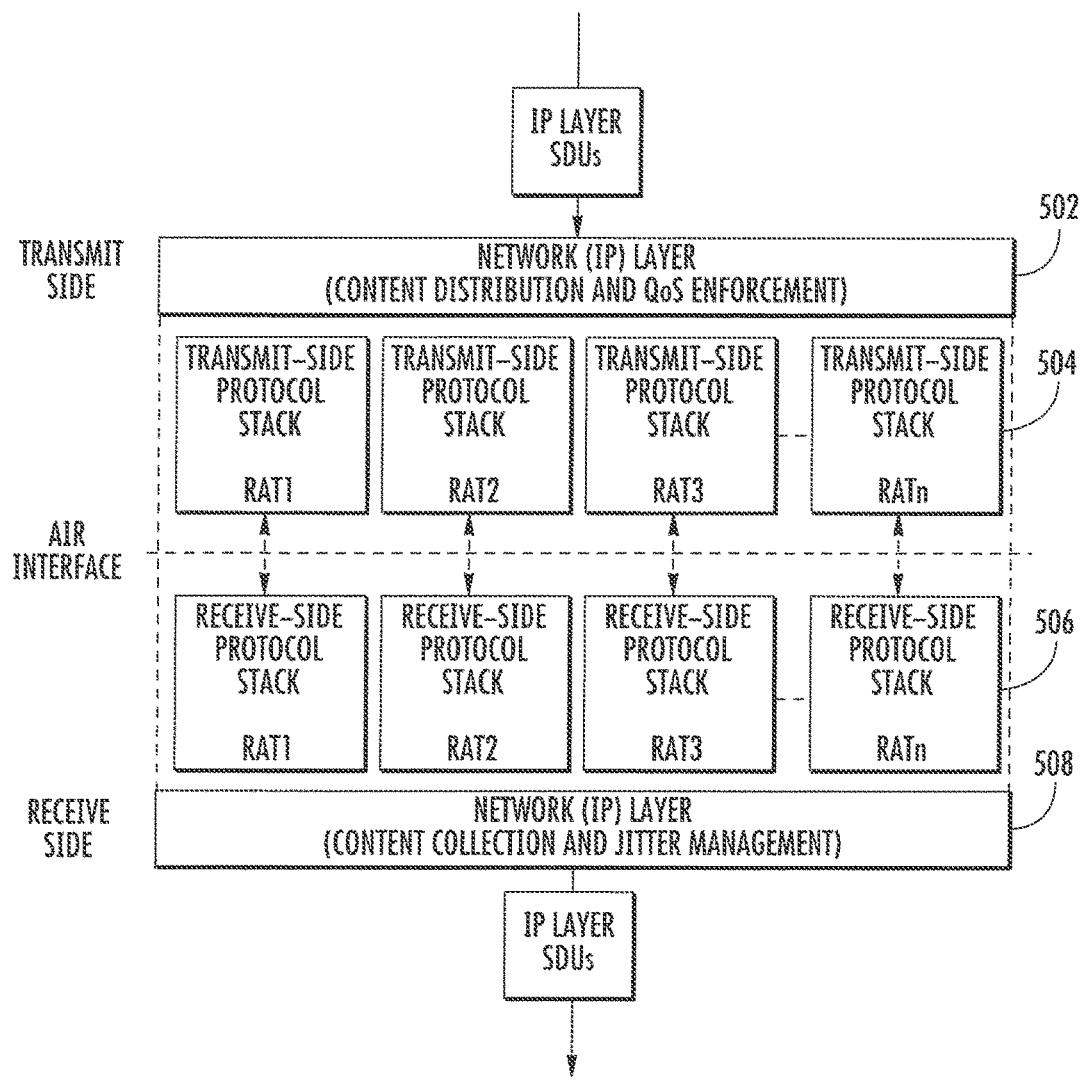
FIG. 5 is a logical block diagram of an exemplary protocol structure for improved IP flow mobility and content distribution in accordance with the present invention.

Referring to FIG. 5, an exemplary protocol structure for improved IP flow mobility and content distribution configured in accordance with one embodiment of the present invention is illustrated. The transmit side includes a network layer 502, such as for example an IP layer, In one implementation, the network layer 502 is responsible for content distribution and QoS enforcement functionality discussed supra. The network layer 502 receives the IP layer service data units (SDU) from a higher layer. The network layer 502 packages the received IP SDUs into IP packets to route to the determined transmit-side protocol stacks 504 of the available RATs. The IP packets are the IP (network) layer's packet data units (PDU). The transmit-side protocol stacks 504 transmit the IP packets over the air interface connecting to the receive-side protocol stack 506 of the respective receive RAT. The receive-side protocol stacks 506 provide the received IP packets to the receive side network layer 508. In one embodiment, the receive side network layer 508 handles content collection and jitter management functionality as discussed above. For example, the jitter management functionality includes a buffer sized to be longer than the maximum one-way transmission delay over the available data links.

After the receive side network layer 508 has processed the received IP packets, the IP packets (i.e. PDUs) are provided to the appropriate layer for further processing.

In the case of the same operator's networks, the foregoing functions lie between the common IP layers associated with one of multiple radio access technologies of the network shared by the device. In the case of different operators' network, the content distribution and collection function, in one implementation, lies outside of the radio access network protocols (and in the common core network, as illustrated by FIG. 6).

Figure 6:
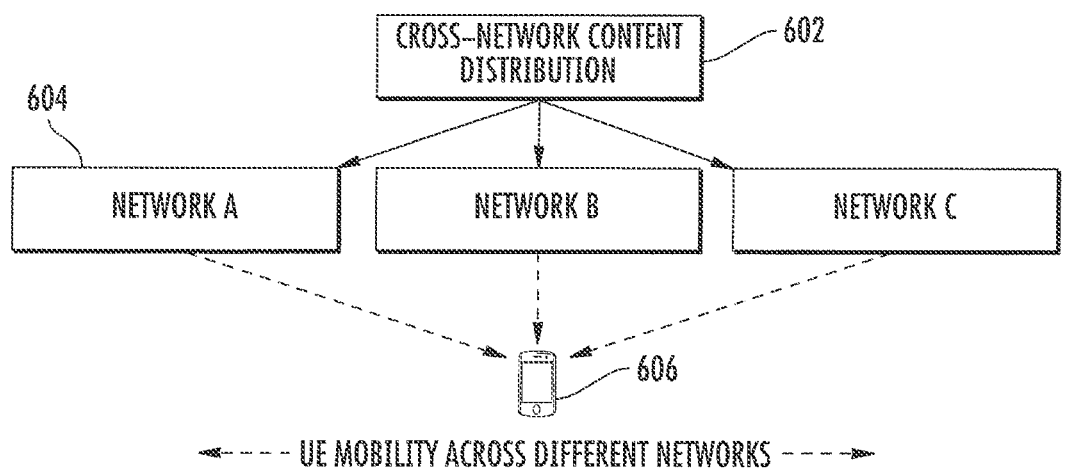
FIG. 6 is a logical block diagram of an exemplary cross-network content distribution communicating to a client device over heterogeneous networks in accordance with the present invention.

Referring to FIG. 6, an exemplary cross-network content distribution entity 602 is shown providing content to a client device 604 (e.g. user equipment (UE)) by communicating over a variety of networks 606. The content distribution entity 602 may dynamically allocate IP flows to the client device 604 via any of the suitable networks 606, as discussed elsewhere herein.

Methods—

Figure 7:
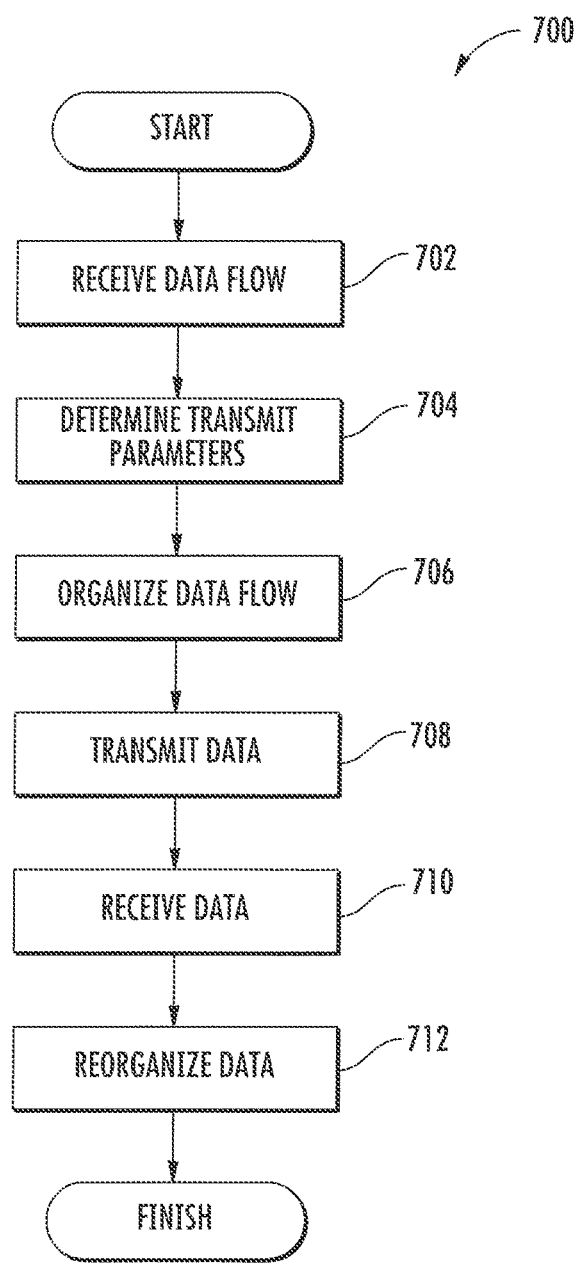
FIG. 7 is a logical flow diagram detailing one embodiment of a generalized method for dynamically allocating data flows across multiple networks, in accordance with the present invention.

Referring now to FIG. 7, one embodiment of a generalized method 700 for dynamically allocating IP flows across multiple networks is illustrated. In one scenario, a client device (e.g., UE) is capable of communicating over a multitude of possible RATs. For example, the client device may be able communicate with a network over an LTE RAT or an 802.11-based RAT. In one implementation, a cross-network content distribution entity is responsible for allocating the IP flows across a variety of network RATs available to the client device.

As a brief aside, in an IP-based radio access network, an IP session is established or torn down after a data link layer connection is established or torn down respectively. Thus, a new IP connection needs to be established once a data link layer connection on any available radio access networks for the client device is configured. Therefore, if the IP packets associated with multimedia content (such as video streaming or VoIP) or any other IP-based application are scheduled for a particular client device having several radio connections with the network, the network layer packets can be distributed across the connections which, for example, meet the QoS requirements of the service being provided.

Referring back to FIG. 7, at step 702 of the method 700, data to be dynamically allocated to networks is received. In one embodiment, the IP flows are received in the form of IP packets. The IP packets may be received from the same flow, or from a variety of different flows. The IP packets are for example downlink communications initiated by a request from applications and/or services running on the client device. For instance, the data packets may be received from an application requesting to stream video content with a content provider, or initiating a voice call on the client device.

The IP packets of the received data packets are sequenced in order to facilitate reorganization (described subsequently hereafter, at step 712). In one implementation, the received packets of the IP flow are sequenced using information located in the header of the IP packets. For example, in the case of the Real-time Transport Protocol (RIP), the IP packets may be sequenced using the sequence number and time stamp of the RTP header. Note that for example IPv4, IPv6, and User Datagram Protocol (UDP) do not carry a sequence in their respective headers. However, the TCP header does include a 32-bit sequence number that can be used to sequence and arrange the IP packets, and to detect lost or late packets at the receiver. Thus, depending on the type of the IP packet (e.g., IP/UDP/RTP/, IP/TCP, etc.), the sequence number of either the RTP of the TCP headers may be used for the purpose of sequencing the IP packets. Moreover, yet other protocols may be used consistent with the invention in addition to those listed above.

As a brief aside, given the use of standard IP/UPD/RTP or IP/TCP protocols over the data-plane of different radio interfaces, and that the checksum sequences in UDP and TCP headers are calculated based on the application layer payloads, inserting a sequence number directly into the header would affect existing protocols. One salient advantage of the exemplary embodiments of the present invention is that by not directly inserting packet sequencing number within the received IP packets, the packet may be sequenced without modifying the existing protocols (e.g., compensating for the resolution of insertion of the packet sequence with the check sum).

At step 704, the transmit parameters for the received IP flows are determined. In one embodiment, the transmit parameters are classifications of the received IP packets. The classification may be based on one or more of parameters, such as priority or importance of the particular IP packets (for example in terms of acceptable degradation), minimum QoS requirements associated with the IP packets, service type (e.g. VoIP, audio/video streaming, etc.), amount of resources required by the IP packets, and/or other service related parameters. It is readily apparent that the possible classifications are in no way limited to the aforementioned parameters, which are provided for illustration only.

At step 706, the received IP flow is organized. In one embodiment, the received IP flow is organized to assign particular data of the received flow data is a network interface in order to be transmitted. The network interfaces may comprise any suitable RAT to communicate with over a desired network. The determined transmit parameters are used at least in part to organize assignments of data to particular network interfaces. For example, the received data may have been classified according a required minimum required data rate. Thus, the data in the exemplary configuration will only be assigned to a network interface that supported the minimum required data rate.

In one implementation, the data is further assigned according to or based upon feedback from the network interfaces. For example, the feedback may include network interface availability, channel conditions of the network link, inter-RAT interface among the available network interfaces, reliability of the network link, maximum delay over the network link, etc. The feedback may be instantaneously provided, and/or may be based on statistical analysis (e.g., the performance of a network link over a certain period of time). The feedback is used in part to make assignment decisions when organizing the received IP flow. The feedback may also be used to assess the quality and reliability of the radio link over the averages of the short term or long term possibility of error over a corresponding network interface. The feedback allows for a determination of the amount of data that can be routed through each available network interface.

One salient advantage of using feedback from the network interfaces is that the data organization can account for varying link conditions experienced over time. For example, a network interface link may experience deterioration. In response, the received data may be assigned to a lower data rate network interface, or a network interface utilizing a lower modulation scheme. The data may also be repeated over the network interface in order to improve reliability of the connection to compensate for the deterioration of the link.

At step 708, the organized data is transmitted. In one embodiment, once the data has been distributed to the available network interfaces (based on the data assignments), the data is transmitted over wireless network interfaces. The network interfaces may, depending on implementation, perform any requisite management of the transmission, such as for example, automatic repeat request (ARQ) or hybrid automatic repeat request (HARQ), and any other link-specific error detection, correction, adaptation, or recovery performed in accordance with to network interface's protocols.

At step 710, the transmitted data is received. In one embodiment, the received data is collected and analyzed in order to determine whether or not any data is missing that should have been otherwise received, and also to detect any duplicate data received for removal. In one implementation, if any missing data is detected, the respective network interface responsible for receiving the data can be directed to send a request for retransmission, or otherwise decide that no retransmission is necessary. In one variant, the network interfaces responsible for receiving the transmitted data are responsible for providing feedback to the transmitting network interfaces such as, for example, quality indications of the link, or errors in the data received.

At step 712, the received data is reorganized. In one embodiment, the data is reorganized using sequencing information as discussed with respect to step 704 above. The sequencing number is used to reorganize the data into its proper order to create the IP flow received at step 702, and to enable proper delivery of the IP flow to the target destination. It is appreciated, however, that other organization techniques (i.e., other than ordering or temporal sequencing) may be used consistent with the invention. For instance, packets may be ordered according to a priority (aside from any temporal aspects associated therewith), by payload type, size, etc.

While the foregoing discussion was cast in the context of a downlink communication with a client device, the generalized methodology described with respect to FIG. 7 is equally applicable in both downlink and uplink directions. For example, in the uplink direction, the client device would implement the functionality of the cross-network content distribution entity (such as monitoring and selecting the best available radio links, and distributing the IP flows across those radio links).

Example Operation—

Figure 8:
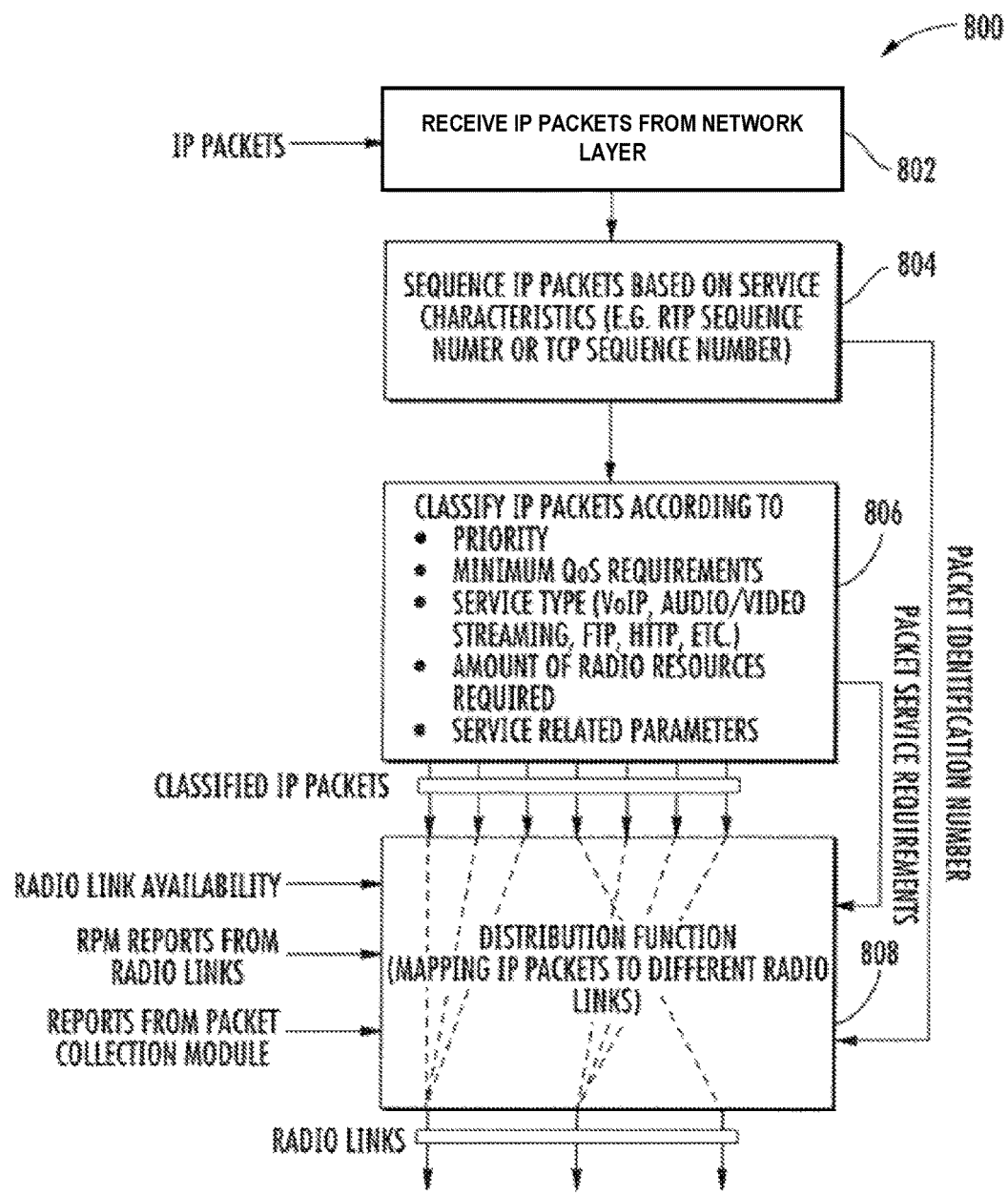
FIG. 8 is a logical flow diagram of an exemplary implementation of FIG. 7.

Referring now to FIG. 8, one exemplary implementation 800 of the method of 700 of FIG. 7 is shown and described. Specifically, the exemplary implementation 800 of FIG. 8 is described in the context of dynamically allocated IP flows across multiple RAT interfaces of a device. In one scenario, the device is a multi-radio solution capable of communicating with a LTE network, a WiMAX network, and an 802.11-based network. While the following operation is described in relation to LTE, WiMAX, and 802.11-based networks, it is readily appreciated that various aspects of the present invention are widely applicable to various forms of data communication and corresponding RATs.

At step 802, IP packets are received from the network layer of the device. The received IP packets are from various applications and services running on the resident device.

The received IP packets are collected and provided to the packet sequencing function.

At step 804, the received IP packets are sequenced based on the service characteristics of the IP packets. If the IP packets belong to a service implementing TCP, then the IP packets are sequenced according to the TCP header 32-bit sequence number. If the IP packets belong to a service implementing RTP, then the IP packets are sequenced according to the RTP header sequence number and time stamp information. The packet identification numbers of the sequenced IP packets are provided to the distribution function. The sequenced IP packets are provided to step 806 for classification.

At step 806, the sequenced IP packets are classified according to the IP packet's priority, minimum QoS requirements, service type, amount of radio resources required to transmit, and/or other service-related parameters. Based on the classification of the IP packets, the corresponding packet service requirements are provided to the distribution function (see step 808).

At step 808, the distribution function maps the received classified IP packets to the appropriate radio interface link. The appropriate radio interface link is selected based on an algorithm, which considers the packet service requirements of the respective IP packet against reported available radio links and their condition. Only the radio connections that can satisfy the minimum QoS requirements of the packets as indicated by their respective packet service requirements are considered available radio links. The distribution function determines the conditions of the radio links by receiving radio resource management reports (RRM) from the radio interfaces in addition to reports from the Packet Collection module at the receive side. The Packet Collection module monitors the experienced packet loss and retransmission reports for missing packets. Thereafter, the distribution function can assign the IP packets to the respective radio interfaces that can support the IP packets service requirements. By monitoring the quality of the radio links, the distribution function can dynamically adjust the allocations among the radio links as appropriate. In this manner, the distribution function provides the radio interfaces with the assigned IP packets and their respective packet identification; this information is used for transmission over the radio link.

The IP packets are retrieved from each radio link, queued, and assembled according to their sequence number at the destination. The collection function may further request transmission of any lost or delayed IP packets through more reliable links and with more reliable transmission formats if necessary. Depending on the importance of the payload in reconstruction of the content, some lost or delayed IP packets may be tolerated.

Exemplary Client Apparatus—

Figure 9:
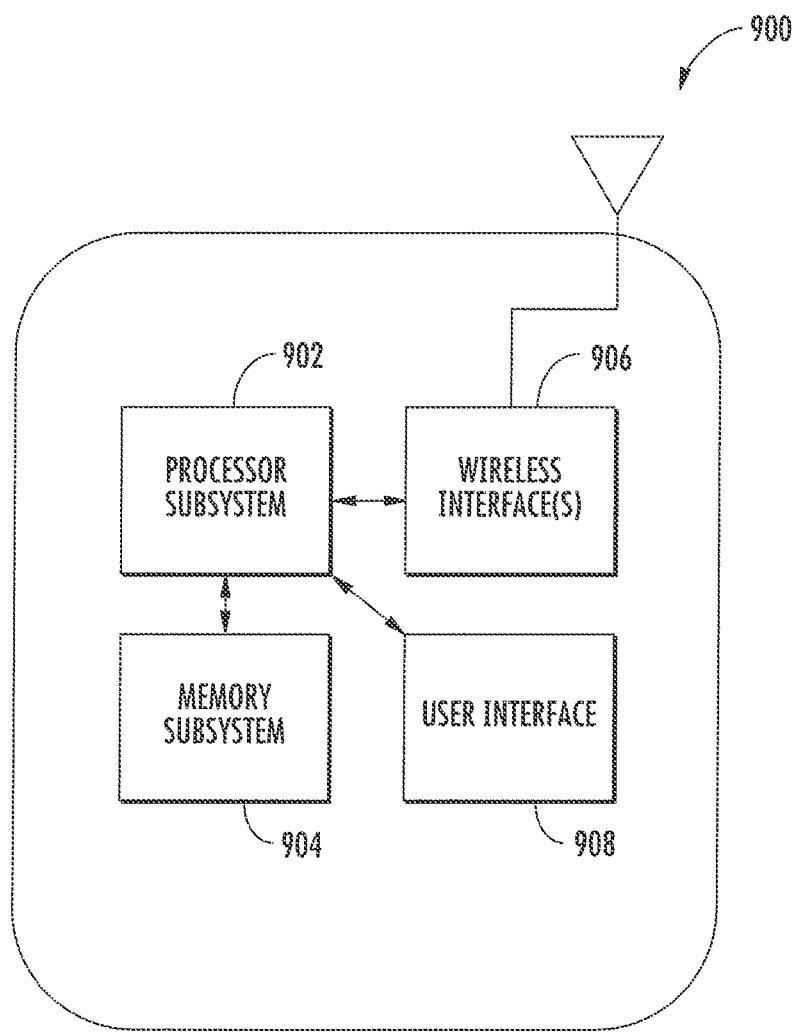
FIG. 9 is functional block diagram of an exemplary user device apparatus configured to dynamically allocate data flows across heterogeneous networks, in accordance with the present invention.

Referring now to FIG. 9, an exemplary embodiment of a user device or apparatus 900 to dynamically allocate IP flows across heterogeneous networks is illustrated. As used herein, the term "user device" includes, but is not limited to cellular telephones, smartphones (such as for example an iPhone™ manufactured by the Assignee hereof), handheld or tablet computers, laptops, personal media devices (PMDs), or any combinations of the foregoing. While a specific device configuration and layout is shown and discussed, it is recognized that many other configurations may be readily implemented by one of ordinary skill given the present disclosure, the apparatus 900 of FIG. 9 being merely illustrative of the broader principles of the invention.

The processing subsystem 902 includes one or more of central processing units (CPU) or digital processors, such as a microprocessor, digital signal processor, field-programmable gate array, RISC core, a baseband processor, or plurality of processing components mounted on one or more substrates. In some embodiments, one or more of the above-mentioned processors (e.g. the baseband processor) are further configured to implement the dynamic allocation of data across heterogeneous networks methods or protocols described previously herein.

The processing subsystem is coupled to non-transitory computer-readable storage media such as memory 904, which may include for example SRAM, FLASH, SDRAM, and/or HDD (Hard Disk Drive) components. As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM. The processing subsystem may also include additional co-processors, such as a dedicated graphics accelerator, network processor (NP), or audio/video processor. As shown, the processing subsystem 902 includes discrete components; however, it is understood that in some embodiments they may be consolidated or fashioned in a SoC (system-on-chip) configuration.

The apparatus 900 further includes wireless interfaces 906 which are configured to transmit and receive signaling. For instance, in one variant, an LTE (e.g., Release 8 or beyond) cellular interface is provided, as well as a WLAN (e.g., IEEE Std. 802.11a/b/g/n/v/-2012 compliant) interface.

The user device 900 further includes a user interface 908, such as for example a "multi-touch" or other touch-screen user display and input device of the type well known in the art. The present invention contemplates that one or more user inputs may be received via the interface 908 to, inter alia, configure the foregoing IP flow mobility functions of the invention from the user device side. For example, the user might set preferences for the handling of their IP flows, priorities between types of data, and so forth, that can be used to configure the various processes and entities (e.g., the aforementioned content distribution or collection functions 304, 306). That being said, the invention also contemplates completely user-transparent variants wherein the content distribution, collection, prioritization, and other functions are wholly handled via one or more computer programs resident on the user device (such as in the non-transitory storage medium referenced herein).

In one exemplary embodiment, the non-transitory computer-readable storage media includes instructions which when executed by the processor, sequence and prioritize one or more data packets, and transmit the data packets via a heterogeneous network according to the sequence and prioritization for each packet, as described supra with respect to the exemplary embodiments. Similarly the storage media of the client device 900 may include instructions which when executed by the processor, receive a plurality of data packets via a heterogeneous network according to a sequence and prioritization for each packet, and re-sequence and re-prioritize one or more data packets, such as for example in response to a request for streaming media from a network server.

Exemplary Server Apparatus

Figure 10:
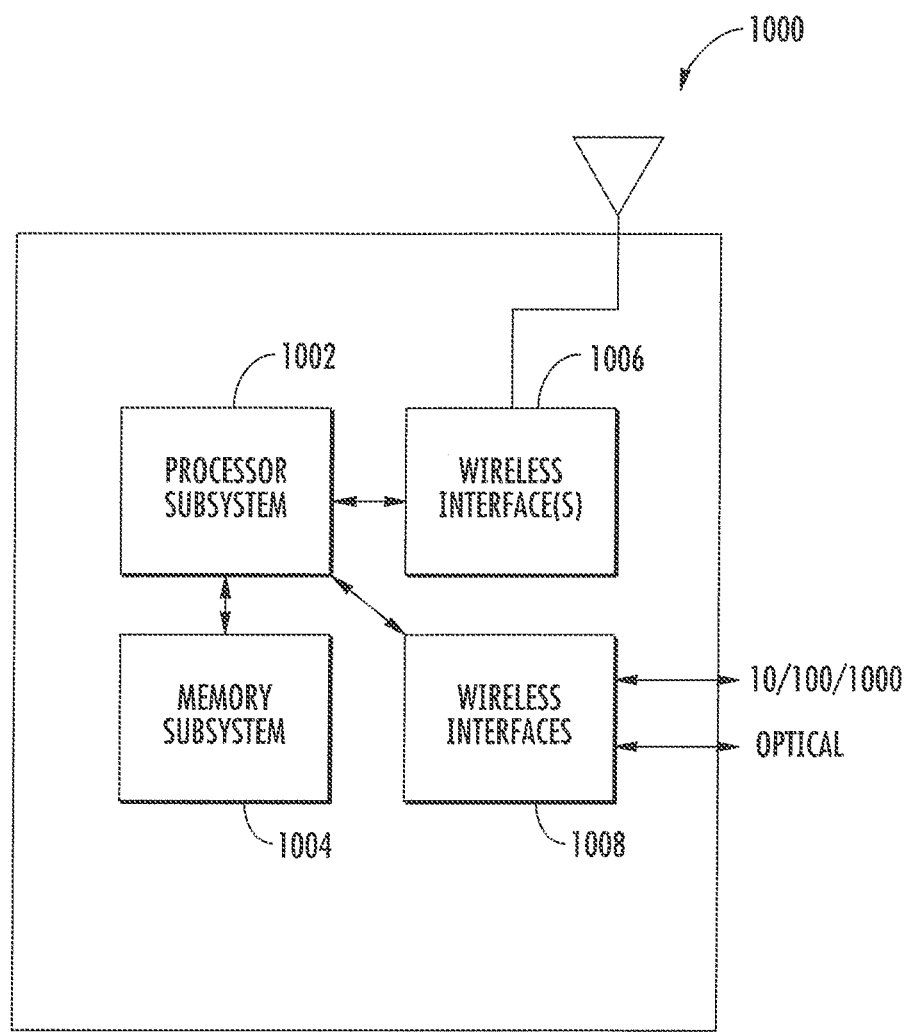
FIG. 10 is a functional block diagram of an exemplary server apparatus supporting dynamic allocation of data flow for a client device across heterogeneous networks, in accordance with the present invention.

Referring now to FIG. 10, an exemplary embodiment of a server apparatus 1000 supporting dynamic allocation of IP flow to/from a client device is illustrated. As used herein, the term "server" includes, but is not limited to, network servers, macrocells, microcells, femtocells, picocells, wireless access points, or any combinations of the foregoing. While a specific device configuration and layout is shown and discussed, it is recognized that many other configurations may be readily implemented by one of ordinary skill given the present disclosure, the apparatus 1000 of FIG. 10 being merely illustrative of the broader principles of the invention.

The processing subsystem 1002 includes one or more of central processing units (CPU) or digital processors, such as a microprocessor, digital signal processor, field-programmable gate array, RISC core, or plurality of processing components mounted on one or more substrates. The processing subsystem is coupled to non-transitory computer-readable storage media such as memory 1004, which may include for example SRAM, FLASH, SDRAM, and/or HDD (Hard Disk Drive) components. As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM. The processing subsystem may also include additional co-processors. As shown, the processing subsystem 1002 includes discrete components; however, it is understood that in some embodiments they may be consolidated or fashioned in a SoC (system-on-chip) configuration.

The apparatus 1000 further includes one or more wireless interfaces 1006 which are configured to receive/send transmissions from/to client devices (including connection request responses). A plurality of wireline "back end" interfaces 1008 are also provided for communication with other network entities, such as for example an Ethernet (10/100/1000/10,000 Mbps) interface, or optical interface. Other interfaces may be used for such back-end communications, including for instance IEEE Std. 1394, *Thunderbolt*, Wi-Fi, WiMAX (IEEE Std. 802.16), and so forth.

In one exemplary embodiment, the non-transitory computer-readable storage media of the apparatus 1000 includes instructions which when executed by the processor, sequence and prioritize one or more data packets, transmit the data packets via a heterogeneous network according to the sequence and prioritization for each packet. The storage media 1004 further includes instructions which, when executed by the processor, receive a plurality of data packets via a heterogeneous network according to a sequence and prioritization for each packet; and re-sequence and re-prioritize one or more data packets. Accordingly, in one variant of the invention, the transmission and reception capabilities of the network apparatus 1000 and the aforementioned user device 900 are largely symmetric and "mirror imaged" (i.e., the server 1000 and the user device 900 can each provide enhanced heterogeneous IP flow mobility on the transmission side, and likewise receive flows which have been enhanced from the other). It will be appreciated, however, that the device configurations can also be asymmetric or heterogeneous, such as where the server 1000 is given more capability than the user device (due to its "thicker" processing capability and power supply), and the user device offloads some of its processing burden to the server.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method comprising:
by a content distribution function of a device:
   receiving, from an application via a network layer, a data flow comprising Internet Protocol (IP) packets having sequence numbers;
   receiving first short term feedback information including a first radio resource size from a first radio interface;
   receiving second short term feedback information including a second radio resource size from a second radio interface;
   determining a distribution, wherein the distribution is based on: i) the first short term feedback information, and ii) the second short term feedback information, wherein the determining a distribution includes determining a first amount of data and determining a second amount of data;
   mapping, from the data flow and based on the distribution, the first amount of data to the first radio interface; and
   mapping, from the data flow and based on the distribution, the second amount of data to the second radio interface;
   wherein corresponding ones of the sequence numbers in the first amount of data and the second amount of data are used to reorder the IP packets in the data flow after transmission via the first radio interface and the second radio interface respectively.

2. The method of claim 1, wherein: i) the first radio interface is based on a cellular radio access technology, and ii) the second radio interface is based on a wireless local area network radio access technology.

3. The method of claim 1, wherein: i) the first radio interface is in communication with a first network, ii) the second radio interface is in communication with a second network, iii) the device is a user equipment (UE), and iv) the determining is responsive to motion of the UE into a coverage area of the second network.

4. The method of claim 1, wherein the determining a distribution is further based on a service type of the application.

5. The method of claim 1, wherein the first short term feedback information comprises first short term error information and the second short term feedback information comprises second short term error information.

6. The method of claim 1, wherein the first short term feedback information comprises first short term quality information and the second short term feedback information comprises second short term quality information.

7. The method of claim 1, wherein the first short term quality information indicates, at a first time subsequent to a time of the determining a distribution, a deterioration of a first link associated with the first radio interface.

8. The method of claim 4, wherein the service type is voice over internet protocol (VoIP).

9. The method of claim 4, further comprising:
receiving a third amount of data from a second application via the network layer; and
transmitting the third amount of data over the first radio interface, wherein the determining a distribution is further based on a second service type of the second application.

10. The method of claim 6, wherein the first short term quality information is provided instantaneously.

11. The method of claim 7, further comprising mapping a third amount of data to the second radio interface at the first time, wherein the second radio interface uses a lower modulation scheme than the first radio interface.

12. The method of claim 7 further comprising repeating the first amount of data from the data flow over the first radio interface at the first time in order to improve reliability.

13. The method of claim 9, wherein: i) the application is voice over internet protocol (VoIP), and ii) the second application is video streaming.

14. A device comprising:
a processor; and
a memory, wherein the memory comprises instructions that when executed by the processor cause a content distribution function of the device to:
receive, from an application via a network layer, a data flow comprising Internet Protocol (IP) packets having sequence numbers,
receive first short term feedback information including a first radio resource size from a first radio interface,
receive second short term feedback information including a second radio resource size from a second radio interface,
determine a distribution including a first amount of data and a second amount of data, wherein the distribution is based on: i) the first short term feedback information, ii) the second short term feedback information, and iii) a service type of the application,
map, from the data flow and based on the distribution, the first amount of data to the first radio interface, and
map, from the data flow and based on the distribution, the second amount of data to the second radio interface;
wherein corresponding ones of the sequence numbers in the first amount of data and the second amount of data are used to reorder the IP packets in the data flow after transmission via the first radio interface and the second radio interface respectively.

15. The device of claim 14, wherein the instructions further cause the device to:
receive, from a second device, a request for retransmission, wherein the distribution is further based on the request for retransmission.

16. The device of claim 14, wherein: i) the first radio interface is based on a cellular radio access technology, and ii) the second radio interface is based on a wireless local area network radio access technology.

17. The device of claim 14, wherein: i) the first radio interface is in communication with a first network, ii) the second radio interface is in communication with a second network, iii) the device is a user equipment (UE), and iv) the distribution is responsive to motion of the UE into a coverage area of the second network.

18. The device of claim 14, wherein the device is a base station.

19. A method comprising:
by a content distribution function of a device:
receiving, from an application via a network layer, a data flow comprising Internet Protocol (IP) packets having sequence numbers;
receiving first long term feedback information including a first radio resource size from a first radio interface;
receiving second long term feedback information including a second radio resource size from a second radio interface;
determining a distribution, wherein the distribution is based on: i) the first long term feedback information, and ii) the second long term feedback information, wherein the determining a distribution includes determining a first amount of data and determining a second amount of data;
mapping, from the data flow and based on the distribution, the first amount of data to the first radio interface; and
mapping, from the data flow and based on the distribution, the second amount of data to the second radio interface;
wherein corresponding ones of the sequence numbers in the first amount of data and the second amount of data are used to reorder the IP packets in the data flow after transmission via the first radio interface and the second radio interface respectively.

20. The method of claim 19, wherein the first long term feedback information includes a maximum sustained data rate over the first radio interface, a reliability of the first radio interface and a maximum delay of the first radio interface.

* * * * *